United States Patent [19]

Suek

[11] Patent Number: 4,507,435

[45] Date of Patent: Mar. 26, 1985

[54] BLENDS OF POLYVINYL CHLORIDE AND COPOLYMERS CONTAINING PARA-METHYL STYRENE AND ACRYLONITRILE HAVING IMPROVED CLARITY

[75] Inventor: Edmond L. Suek, Skillman, N.J.

[73] Assignee: Mobil Oil Corporation, New York, N.Y.

[21] Appl. No.: 565,425

[22] Filed: Dec. 27, 1983

[51] Int. Cl.³ .................... C08L 51/04; C08L 55/02; C08L 27/06
[52] U.S. Cl. ..................................... 525/86; 525/238
[58] Field of Search ................................. 525/86, 233

[56] References Cited

U.S. PATENT DOCUMENTS

| | | | |
|---|---|---|---|
| 2,802,809 | 8/1957 | Hayes | 525/74 |
| 2,988,530 | 6/1961 | Slocombe et al. | 260/31.8 |
| 3,053,800 | 9/1962 | Grabowski et al. | 525/86 |
| 4,306,049 | 12/1981 | Prapas | 526/347 |

Primary Examiner—Carman J. Seccuro
Attorney, Agent, or Firm—Alexander J. McKillop; Michael G. Gilman; Edward J. Trojnar

[57] ABSTRACT

The clarity of blends of polyvinyl chloride (PVC) and acrylonitrile-butadiene-styrene graft copolymer (ABS) is improved by the use of a para-methyl styrene-acrylonitrile copolymer (PMS-AN) as an additive or by substituting acrylonitrile-butadiene-para-methyl styrene graft copolymer (ABPMS) for ABS.

11 Claims, No Drawings

BLENDS OF POLYVINYL CHLORIDE AND COPOLYMERS CONTAINING PARA-METHYL STYRENE AND ACRYLONITRILE HAVING IMPROVED CLARITY

CROSS REFERENCE TO RELATED APPLICATIONS

A copending application Ser. No. 489,873 filed Apr. 29, 1983, now U.S. Pat. No. 4,464,514 of James G. Murray and Edmond L. Suek discloses high clarity blends of polyvinyl chloride and para-methyl styrene-acrylonitrile copolymers.

BACKGROUND OF THE INVENTION

Polyvinyl chloride (PVC) is blended with other resins to improve its processing characteristics and physical properties. For example, polyvinyl chloride has been blended with acrylonitrile-butadiene styrene graft copolymer (ABS). While such blends result in the desired improvements in processability and physical properties, the optical characteristics are generally impaired. In accordance with this invention the improvements in processability and physical properties are obtained without substantial loss of optical properties, particularly clarity.

BRIEF DESCRIPTION OF THE INVENTION

This invention relates to polymeric blends comprising a copolymer of methylstyrene isomer containing at least 90 percent of the para-isomer (PMS) and acrylonitrile, and polyvinyl chloride. The copolymer of para-methyl styrene and acrylonitrile can be either an ABPMS graft copolymer or a random copolymer of para-methyl styrene and acrylonitrile (PMSAN), in which case, the blend of this invention also contains a ABS copolymer and the PMSAN serves as an agent which improves clarity of the PVC/ABS blend. The blends exhibit high clarity compared to corresponding blends of polyvinyl chloride and ABS and have the improved processing characteristics and physical properties of PVC-ABS blends.

DETAILED DESCRIPTION OF THE INVENTION

The essential components of this invention are polyvinyl chloride and an acrylonitrile-diene-aromatic olefin graft copolymer, containing an effective amount of an acrylonitrile-PMS copolymer. The diene component is preferably butadiene. The aromatic olefin can be styrene or PMS. Thus, one aspect of this invention, where the aromatic olefin is PMS, relates to a two component composition comprising PVC and ABPMS. A second aspect of this invention relates to a ternary blend comprising PVC, ABS and PMSAN in which the necessary PMS-AN copolymer component is represented by PMSAN rather than the ABPMS component of the first aspect of the invention.

Proportions in the blends of this invention can vary widely. It is essential that the compositions include sufficient acrylonitrile-diene-aromatic olefin copolymer to achieve the improvement in physical properties desired. Generally this amount is about 5 to 30, preferably 10 to 20 weight percent. Thus, in the two component blends PVC comprises about 70 to 95 weight percent, preferably 80 to 90 weight percent, and ABPMS comprises 5 to 30 weight percent. In the three component blends, it is essential that sufficient ABS graft copolymer be present to achieve the desired physical properties and that sufficient PMSAN copolymer be present to achieve the desired clarity. Thus the ABS comprises 5 to 30 weight percent of the ternary blend and the PMSAM is present in a sufficient amount to achieve the desired clarity, preferably an amount about equal or greater than the ABS.

The components of the blends of this invention are known materials. Polyvinyl chloride is commercially available. Random copolymers of methylstyrene isomers with acrylonitrile and acrylonitrile-butadiene-para-methyl styrene (ABPMS) graft copolymers are described in U.S. Pat. No. 4,306,049 which is incorporated herein by reference. ABS graft copolymers are described in Kirk-Othmer, *Encyclopedia of Chemical Technology*, Third Edition, Vol. 1, pp. 442–455. ABPMS can also be prepared in a manner analogous to that used for ABS production.

The polyvinyl chloride polymer contains at least about 80 weight percent of polymerized vinyl chloride with any remainder comprising one or more monoethylenically unsaturated monomers. Thus, the homopolymer of vinyl chloride can be used as well as copolymers of vinyl chloride with a variety of comonomers copolymerizable therewith.

The PMSAN copolymer generally comprises 50 to 90 weight percent of methylstyrene and 10 to 50 weight percent of acrylonitrile. The methylstyrene is preferably high in the para-isomer. Generally, the para-isomer comprises at least 90 weight percent of the methylstyrene isomers and most preferably at least about 95 weight percent. The remainder is mostly the meta-isomer with little or no ortho-isomer present in accordance with the disclosure of U.S. Pat. No. 4,306,049.

The blends of this invention are made in the known manner by mixing the two resins above their melting points in suitable equipment such as a roll mill, Banbury mixer, extruder or the like. Temperatures in the range of 165° C. to 175° C. are effective.

The blends can contain additional ingredients such as lubricants, e.g. stearic acid, and stabilizers commonly used in the art. The blends can contain other compatible polymers particularly if the clarity of the blend is not affected. Preferably, the blends contain the polyvinyl chloride polymer, and the ABPMS copolymer or ABS and SAN copolymers as the sole polymeric constituents.

The blends of this invention are useful in the molding of articles such as containers, particularly in the fabrication of containers in which clarity is a desirable characteristic.

The invention is illustrated by the following non-limiting example in which all parts are by weight.

EXAMPLES 1–2

Blends in accordance with this invention were prepared and molded for comparison with control moldings (C-1, C-2, C-3). The blends were prepared by placing the compositions set forth below on a two roll mill and milling for about five minutes at temperatures ranging from about 165° C. to about 175° C. The milled samples were molded in a PHI press (Pasadena Hydraulics Inc.). The compositions were heated with the platens touching for about five minutes at 190° C., folowed by molding for two minutes at 10,000 psi, two minutes at 20,000 psi, two minutes at 30,000 psi, and finally a ten-minute cooling cycle. Light transmission and haze were determined according to ASTM-D1003 and recorded below.

|  | C-1 | C-2 | C-3 | Example 1 | Example 2 |
|---|---|---|---|---|---|
| PVC | 100 | 70 | 67 | 70 | 67 |
| SAN | — | 15 | 15 | — | — |
| PMSAN | — | — | — | 15 | 15 |
| ABS | — | 15 | 18 | 15 | 18 |
| Thermolite 31 | 2.0 | 2.0 | 2.0 | 2.0 | 2.0 |
| Stearic Acid | 0.5 | 0.5 | 0.5 | 0.5 | 0.5 |
| Gardner Haze | 10.7 | 69.1 | 66.6 | 34.8 | 39.7 |
| Light Trans. | 70.0 | 50.6 | 54.0 | 74.7 | 77.0 |
| Izod Impact | 0.52 | 14.0 | 16.4 | 13.2 | 16.5 |

PVC is a polyvinyl chloride resin obtained from Ethyl Corporation identified as E-185.

SAN is a styrene-acrylonitrile containing a weight ratio of styrene to acrylonitrile of about 70 to 30 available from Monsanto as SAN 31.

PMSAN is a copolymer of para-methyl tyrene and acrylonitrile in a weight ratio of about 70 to 30.

Thermolite 31 is a stabilizer available from M and T Chemicals.

Although the present invention has been described with preferred embodiments, it is to be understood that modifications and variations can be resorted to without departing from the spirit and scope of this invention as those skilled in the art will readily understand. Such variations and modifications are considered to be within the purview and scope of the appended claims.

I claim:

1. A composition comprising a polyvinyl chloride polymer and a graft copolymer of acrylonitrile, diene and as the sole alkenyl aromatic hydrocarbon, methyl styrene containing at least 90 percent of the para-isomer, said composition having improved clarity compared to the corresponding composition in which the graft copolymer contains styrene instead of para-methyl styrene.

2. A composition comprising a polyvinyl chloride polymer, an acrylonitrile-diene-styrene graft copolymer and a sufficient amount of copolymer of acrylonitrile and as the sole alkenyl aromatic hydrocarbon, methyl styrene containing at least 90 percent of the para-isomer to achieve better clarity than the corresponding composition without the added copolymer of acrylonitrile and para-methyl styrene.

3. The composition of claim 1 in which said diene is butadiene.

4. The composition of claim 1 which comprises 70 to 95 weight percent of said polyvinyl chloride polymer and 30 to 5 weight percent of said graft copolymer.

5. The composition of claim 1 which comprises 80 to 90 weight percent of said polyvinyl chloride polymer and 20 to 10 weight percent of said graft copolymer.

6. The composition of claim 4 in which said diene is butadiene.

7. The composition of claim 5 in which said diene is butadiene.

8. The composition of claim 2 in which said diene is butadiene.

9. The composition of claim 2 in which comprises 40 to 90 weight percent of polyvinyl chloride polymer, 30 to 5 weight percent acrylonitrile-diene-styrene graft copolymer and 30 to 5 weight percent of acrylonitrile-para-methyl styrene copolymer and which is greater or equal to the amount of said acrylonitrile-diene-styrene copolymer.

10. The composition of claim 2 in which comprises 60 to 90 weight percent of polyvinyl chloride polymer, 20 to 5 weight percent acrylonitrile-diene-styrene copolymer and 20 to 5 weight percent of acrylonitrile-para-methyl styrene copolymer and which is greater or equal to the amount of said acrylonitrile-diene-styrene graft copolymer.

11. The composition of claim 9 in which said diene is butadiene.

* * * * *

UNITED STATES PATENT AND TRADEMARK OFFICE
CERTIFICATE OF CORRECTION

PATENT NO. : 4,507,435

DATED : March 26, 1985

INVENTOR(S) : EDMOND L. SUEK

It is certified that error appears in the above-identified patent and that said Letters Patent is hereby corrected as shown below:

Column 2, line 65: "folowed" should be --followed--.

Column 3, line 22: "tyrene" should be --styrene--.

Column 4, line 30: after "styrene" insert --graft--.
  (Claim 9, line 6)

Column 4, line 34: after "styrene" insert --graft--.
  (Claim 10, line 3)

Signed and Sealed this

Ninth Day of July 1985

[SEAL]

Attest:

DONALD J. QUIGG

Attesting Officer    Acting Commissioner of Patents and Trademarks